United States Patent
Kim

(10) Patent No.: US 11,816,796 B2
(45) Date of Patent: Nov. 14, 2023

(54) STIMULATION SIMULATION METHOD, SERVER AND COMPUTER PROGRAM USING BRAIN MODEL OF BRAIN LESION PATIENT

(71) Applicant: NEUROPHET Inc., Seoul (KR)

(72) Inventor: Dong Hyeon Kim, Seoul (KR)

(73) Assignee: NEUROPHET Inc., Seoul (KR)

( * ) Notice: Subject to any disclaimer, the term of this patent is extended or adjusted under 35 U.S.C. 154(b) by 62 days.

(21) Appl. No.: 17/677,842

(22) Filed: Feb. 22, 2022

(65) Prior Publication Data

US 2023/0008475 A1 Jan. 12, 2023

(30) Foreign Application Priority Data

Jul. 7, 2021 (KR) .......................... 10-2021-0089053

(51) Int. Cl.
*G06T 15/00* (2011.01)
*G06T 17/20* (2006.01)
*G06T 7/10* (2017.01)

(52) U.S. Cl.
CPC .............. *G06T 17/20* (2013.01); *G06T 7/10* (2017.01); *G06T 2207/10081* (2013.01);
(Continued)

(58) Field of Classification Search
CPC .......... G06T 7/10; G06T 17/20; G06T 7/0012; G06T 7/11; G06T 2207/10088;
(Continued)

(56) References Cited

U.S. PATENT DOCUMENTS

| 8,718,758 B2 * | 5/2014 | Wagner | .................... A61N 1/40 607/45 |
| 9,681,820 B2 * | 6/2017 | Wagner | ................ A61B 5/0036 |

(Continued)

FOREIGN PATENT DOCUMENTS

| KR | 101758903 B1 | 7/2017 |
| KR | 1020190028901 A | 3/2019 |
| KR | 1020210045577 A | 4/2021 |

OTHER PUBLICATIONS

Salehi SS, Erdogmus D, Gholipour A. Tversky loss function for image segmentation using 3D fully convolutional deep networks. InMachine Learning in Medical Imaging: 8th International Workshop, MLMI 2017 with MICCAI 2017, Quebec City, Sep. 10, 2017, Proceedings 8 2017 (pp. 379-387).*

(Continued)

*Primary Examiner* — Phu K Nguyen
(74) *Attorney, Agent, or Firm* — BROADVIEW IP LAW, PC

(57) ABSTRACT

Provided is a stimulation simulation method, server and, computer program using a brain model of a brain lesion patient. The stimulation simulation method using a brain model of a brain lesion patient according to various embodiments of the present invention is a stimulation simulation method using a brain model of a brain lesion patient performed by a computing device, the method includes: collecting brain images of the brain lesion patient; generating the brain model for the brain lesion patient by using the collected brain images; and simulating stimulation to the brain of the brain lesion patient by using the generated brain model.

11 Claims, 10 Drawing Sheets

(52) U.S. Cl.
CPC ............... *G06T 2207/10088* (2013.01); *G06T 2207/10136* (2013.01); *G06T 2207/30016* (2013.01); *G06T 2207/30096* (2013.01); *G06T 2210/41* (2013.01)

(58) Field of Classification Search
CPC ....... G06T 2210/41; G06T 2207/10081; G06T 2207/30016; G06T 2207/20084; G06T 2207/10136; G06T 2207/30096
USPC ........................................................ 345/418
See application file for complete search history.

(56) References Cited

U.S. PATENT DOCUMENTS

| | | | | |
|---|---|---|---|---|
| 9,913,976 | B2* | 3/2018 | Wagner | A61N 1/36182 |
| 11,298,553 | B2* | 4/2022 | Moffitt | A61N 1/36071 |
| 11,395,920 | B2* | 7/2022 | Madhavan | G16H 10/60 |
| 11,617,887 | B2* | 4/2023 | Rao | A61N 1/36103 |
| | | | | 607/45 |
| 11,633,598 | B2* | 4/2023 | De Ridder | A61N 1/36171 |
| | | | | 607/46 |
| 2021/0192759 | A1* | 6/2021 | Lang | G06T 3/40 |
| 2023/0008475 | A1* | 1/2023 | Kim | G06T 7/10 |

OTHER PUBLICATIONS

Liu B, Gould S, Koller D. Single image depth estimation from predicted semantic labels. In2010 IEEE computer society conference on computer vision and pattern recognition Jun. 13, 2010 (pp. 1253-1260). IEEE.*

Brosch T, Tang LY, Yoo Y, Li DK, Traboulsee A, Tam R. Deep 3D convolutional encoder networks with shortcuts for multiscale feature integration applied to multiple sclerosis lesion segmentation. IEEE transactions on medical imaging. Feb. 11, 2016;35(5):1229-39.*

Yogananda CG, Shah BR, Vejdani-Jahromi M, Nalawade SS, Murugesan GK, Yu FF, Pinho MC, Wagner BC, Emblem KE, Bjgrnerud A, Fei B. A fully automated deep learning network for brain tumor segmentation. Tomography. Jun. 2020;6(2):186-93.*

Seetha J, Raja SS. Brain tumor classification using convolutional neural networks. Biomedical & Pharmacology Journal. 2018;11(3):1457.*

Mohsen H, El-Dahshan ES, El-Horbaty ES, Salem AB. Classification using deep learning neural networks for brain tumors. Future Computing and Informatics Journal. Jun. 1, 2018;3(1):68-71.*

* cited by examiner

STIMULATION SIMULATION METHOD, SERVER AND COMPUTER PROGRAM USING BRAIN MODEL OF BRAIN LESION PATIENT

CROSS-REFERENCE TO RELATED APPLICATION

This application is based on and claims priority under 35 U.S.C. 119 to Korean Patent Application No. 10-2021-0089053, filed on Jul. 7, 2021, in the Korean Intellectual Property Office, the disclosure of which is herein incorporated by reference in its entirety.

TECHNICAL FIELD

Various embodiments of the present invention relate to a stimulation simulation method, a server, and a computer program using a brain model for a brain lesion patient.

BACKGROUND ART

The brain is an internal organ of a human head and is the highest central organ of a nervous system and is segmented into cerebrum, cerebellum, midbrain, pons, and medulla oblongata. In addition, the brain generates a brain wave which is a signal obtained by measuring a total sum of neuronal activity levels in an epidermis of the brain.

As a method for measuring a state of the brain, there are an EEG (electroencephalogram) test, which measures and examines the brain waves received from electrodes by attaching pads with electrodes to a scalp, a CT scan which examines the brain by taking tomography from various angles by using radiation or ultrasound, an MRI scan which images the brain by magnetic resonance, and the like.

Various concepts are known in the field of neural stimulation of brain structures, and brain stimulation which stimulates the brain to achieve a predetermined purpose is largely classified into invasive brain stimulation and non-invasive brain stimulation.

The invasive brain stimulation is a method in which electrodes are inserted into the brain through surgery and electrical signals are applied, and the non-invasive brain stimulation is a method in which a predetermined effect is achieved by stimulating the brain without inserting the electrodes inside a skull.

Specific brain stimulation includes deep electric stimulation, transcranial magnetic stimulation (TMS), transcranial electric stimulation (TES), transcranial direct current stimulation (tDCS), and transcranial random noise stimulation (tRNS).

Among these brain stimulations, a brain electric stimulation technology using the transcranial direct current stimulation (tDCS) is one of the relatively simple non-invasive brain stimulations that is known to be able to improve cognitive abilities or to be effective in treating various cranial nerve diseases such as depression, attention deficit hyperactivity disorder (ADHD), epilepsy, dementia, and sleep disorders, and thus, the brain stimulations are actively studied.

In the method for stimulating the brain by using a transcranial direct current stimulation (tDCS) device, an anode and a cathode are connected to the transcranial direct current stimulation (tDCS) device that generates a direct current, and when a current is injected into the anode, the current passes through the cerebrum and comes back into the cathode.

In this case, the current flows from the anode to the cathode to stimulate the cerebrum, and it may be necessary to change the direction of the electric stimulation according to the treatment method.

In the related at, in order to more accurately and effectively perform the transcranial direct current stimulation method, a brain model is generated by modeling a brain patient before performing the transcranial direct current stimulation method, and the electrical stimulation is simulated by using the brain mode, so that an optimal treatment strategy (for example, stimulation position, stimulation intensity) for performing the transcranial direct current stimulation method is established.

However, in the case of the optimal treatment strategy establishment method of the related art, the brain patient is modeled according to the same standard regardless of the presence or absence of brain lesions, and stimulation is simulated only by using this model. There is no method to generate a brain model reflecting the brain lesions for a patient with brain lesions such as a patient with cerebral apoplexy. Accordingly, there is a problem in that it is difficult to perform the simulation on the brain lesion patient and to establish an optimal treatment strategy for the brain lesion patient.

SUMMARY OF INVENTION

Technical Problem

For the purpose of solving the problems of the optimal treatment strategy establishment method in the related art, an object of the present invention is to provide a stimulation simulation method, server, and computer program using a brain model for a brain lesion patient, by which a brain model to which a brain lesion is applied is generated by using a brain image for a brain lesion patient, and brain stimulation is simulated by using the brain model, so that brain stimulation simulation for the brain lesion patient can be allowed to be performed, and an optimized treatment method can be derived in consideration of the brain lesion of the brain lesion patient.

An object of the present invention is to provide a stimulation simulation method, server, and computer program using a brain model for a brain lesion patient, by which a big data system is constructed by collecting and storing information about a plurality of brain lesion patients and various information generated by simulating stimulation by using the brain model for each of the plurality of brain lesion patients, so that more accurate segmentation of a brain image and establishment of a treatment strategy can be allowed to be obtained.

The objects of the present invention are not limited to the object mentioned above, and other objects not mentioned will be clearly understood from the following description by the ordinarily skilled in the art.

Solution to Problem

According to one embodiment of the present invention, there is provided a stimulation simulation method using a brain model for a brain lesion patient according to various embodiments of the present invention is a stimulation simulation method using a brain model for a brain lesion patient performed by a computing device, the method includes: collecting brain images of the brain lesion patient; generating the brain model for the brain lesion patient by using the collected brain images; and simulating stimulation to the brain of the brain lesion patient by using the generated brain model.

In various embodiments, the generating the brain model for the brain lesion patient may include: segmenting the collected brain images into a plurality of areas, the plurality of areas including a plurality of first areas corresponding to each structure of the brain and one or more second areas corresponding to a brain lesion; and generating a three-dimensional brain model by using the brain image segmented into the plurality of areas.

In various embodiments, the segmenting the collected brain images into the plurality of areas may include segmenting the collected brain images into the plurality of areas by using a pre-trained first AI model, wherein the pre-trained first AI model is trained by using a plurality of brain images segmented into a plurality of areas which are labeled with information on each of the segmented areas as training data, and is input with an unsegmented brain images and outputs the brain images segmented into the plurality of areas.

In various embodiments, the generating the three-dimensional brain model may include: removing the one or more second areas among the plurality of areas by processing the brain images segmented into the plurality of areas; restoring the brain image from which the one or more second areas are removed by using the pre-trained second AI model, wherein the pre-trained second AI model is trained by using a plurality of brain images from which at least some areas have been removed and a plurality of normal brain images from which at least some areas have not been removed as training data, and is input with a brain image in which at least some area is removed and outputs a brain image in which the removed at least some area is restored; and generating the three-dimensional brain model by using the restored brain images and setting the one or more second areas on the generated three-dimensional brain model based on an attribute of the removed one or more second areas.

In various embodiments, the generating the three-dimensional brain model may include: removing the one or more second areas among the plurality of areas by processing the brain images segmented into the plurality of areas; restoring the brain image from which the one or more second areas are removed by using a pre-trained second AI model; generating a three-dimensional brain model by using the restored brain image; and generating a brain lesion model by using the removed one or more second areas and matching the generated brain lesion model with the generated three-dimensional brain model.

In various embodiments, the segmenting the collected brain images into the plurality of areas may include: collecting information about the brain lesion patient; extracting one or more data corresponding to the collected information about the brain lesion patient from pre-stored big data, wherein the pre-stored big data include at least one among the plurality of brain images corresponding to each of the plurality of patients, a plurality of the brain models corresponding to each of the plurality of brain images, and a plurality of results of the simulation derived by simulating the stimulation by using each of the plurality of brain models; and segmenting the collected brain images into the plurality of areas by using the extracted one or more data.

In various embodiments, the segmenting the collected brain images into the plurality of areas may include: collecting information about the brain lesion patient; segmenting the collected brain image into the plurality of areas by using a pre-trained first AI model; extracting one or more data corresponding to the collected information about the brain lesion patient from pre-stored big data; and verifying the brain images segmented into the plurality of areas by using the extracted one or more data.

In various embodiments, the segmenting the collected brain images into the plurality of area may include selecting one or more first areas having the same attribute as the one or more second areas among the plurality of first areas and combining the selected one or more first areas and the one or more second areas as one area.

In various embodiments, the simulating the stimulation to the brain of the brain lesion patient may include generating a three-dimensional brain map configured with a plurality of meshes based on attributes of each of the plurality of areas included in the generated three-dimensional brain model; and simulating electrical stimulation based on a plurality of stimulation positions according to a preset guide system by using the generated three-dimensional brain map, In various embodiments, the generating the brain model for the brain lesion patient may include generating brain lesion information having an arbitrary attribute based on brain lesion statistical data by gender, race, and age for a plurality of users and generating a virtual brain model by using the generated brain lesion information.

According to another embodiment of the present invention, there is provided a stimulation simulation server using a brain model for a brain lesion patient including: a processor; a network interface; a memory; and a computer program loaded on the memory and executed by the processor, wherein the computer program includes: an instruction for collecting brain images of brain lesion patient; an instruction for generating the brain model for the brain lesion patient by using the collected brain images; and an instructions for simulating stimulation to the brain of the brain lesion patient by using the generated brain model.

According to still another embodiment of the present invention, there is provided a computer program recorded on a computer-readable recording medium and combined with a computing device to execute: collecting brain images of the brain lesion patient; generating the brain model for the brain lesion patient by using the collected brain images; and simulating stimulation to the brain of the brain lesion patient by using the generated brain model.

Other specific details of the present invention are included in the detailed description and the drawings.

Advantageous Effects of Invention

According to various embodiments of the present invention, there is an advantage in that simulation of brain stimulation for the brain lesion patient can be allowed to be performed by generating a brain model to which a brain lesion is applied by using a brain image for a brain lesion patient and simulating brain stimulation by using the brain model, and an optimized treatment method can be derived in consideration of the brain lesion of the brain lesion patient.

In addition, according to various embodiments of the present invention, there is an advantage in that a big data system is constructed by collecting and storing information about a plurality of brain lesion patients and various information generated by simulating stimulation by using the brain model for each of the plurality of brain lesion patients, so that more accurate segmentation of a brain image and establishment of a treatment strategy can be allowed to be obtained.

Effects of the present invention are not limited to the effects mentioned above, and other effects not mentioned will be clearly understood from the following description by those skilled in the art.

DESCRIPTION OF EMBODIMENTS

Figure 1:
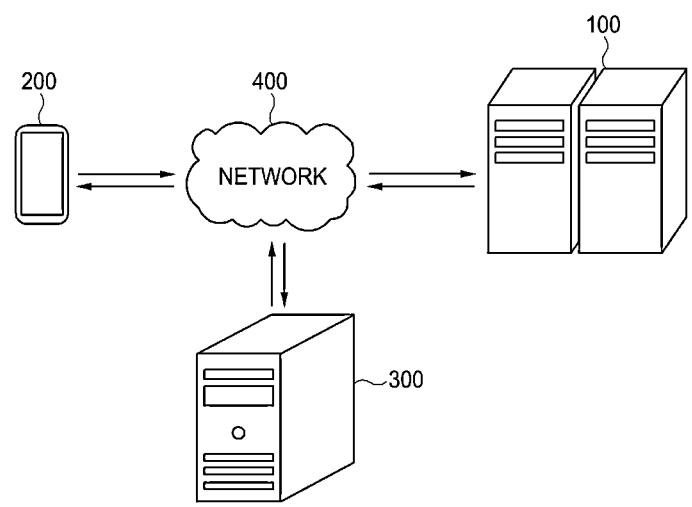
FIG. 1 is a diagram illustrating a stimulation simulation system using a brain model for a brain lesion patient according to an embodiment of the present invention.

Advantages and features of the present invention and methods of achieving the advantages and features will become apparent with reference to embodiments described below in detail in association with the accompanying drawings. However, the present invention is not limited to the embodiments disclosed below, but the present invention can be implemented in various different forms, only the embodiments allow the disclosure of the present invention to be complete, the present invention is provided in order for the ordinarily skilled in the art to which the present invention belongs to fully understand the scope of the present invention, and the present invention is only defined by the scope of the claims.

The terminology used herein is for the purpose of describing the embodiments and is not intended to limit the present invention. In this specification, a singular form also includes a plural form unless a phrase specifically states otherwise. As used in this specification, "comprises" and/or "comprising" does not exclude the presence or addition of one or more other components in addition to the stated components. Throughout this specification, the same or similar reference numerals refer to the same or similar elements, and "and/or" includes each and all combination of one or more of the stated elements. Although "first", "second", and the like are used to describe various elements, of course, these elements are not limited by these terms. These terms are only used to distinguish one component from other components. Accordingly, it goes without saying that a first component mentioned below may be a second component within the spirit of the present invention.

Unless otherwise defined, all terms (including technical and scientific terms) used herein may be used with the meaning commonly understood by the ordinarily skilled in the art to which the present invention belongs. In addition, terms defined in a commonly used dictionary are not to be interpreted ideally or excessively unless specifically defined explicitly.

As used in this specification, the term "unit" or "module" refers to a software component or a hardware component such as FPGA or ASIC, and the "unit" or "module" performs a certain role. However, the "unit" or "module" is not meant to be limited to software or hardware. The "unit" or "module" may be configured to reside on an addressable storage medium or may be configured to reproduce one or more processors. Accordingly, as an example, the "unit" or "module" includes components such as software components, object-oriented software components, class components and task components, processes, functions, attributes, procedures, subroutines, segments of program codes, drivers, firmware, microcode, circuits, data, database, data structures, tables, arrays, and variables. The components and functions provided within the "unit" or "module" may be combined into a smaller number of components and "units" or "modules" or may be further separated in to additional components and "units" or "modules".

Spatially relative terms "below", "beneath", "lower", "above", "upper", and the like can be used to easily describe the relationship between a certain component and other components. Spatially relative terms should be understood as terms that include different directions of components during use or operation in addition to the directions illustrated in the drawings. For example, in a case where a component illustrated in the drawings is turned over, a component described as "below" or "beneath" of the other component may be placed "above" of the other component. Accordingly, the exemplary term "below" may include both directions below and above. Components may also be oriented in other orientations, and thus, spatially relative terms may be interpreted according to orientation.

In this specification, a computer denotes all types of hardware devices including at least one processor and may be understood as collectively including software configurations operating in a corresponding hardware device according to embodiments. For example, a computer may be understood as meaning including all of a smartphone, a tablet PC, a desktop, a notebook, and a user client and an application running in each device, but the present invention is not limited thereto.

Hereinafter, an embodiment of the present invention will be described in detail with reference to the accompanying drawings.

Each step described in this specification is described as being performed by a computer, but the object of each step is not limited thereto, and at least a portion of each step may be performed in different devices according to embodiments.

FIG. 1 is a diagram illustrating a stimulation simulation system using a brain model for a brain lesion patient according to an embodiment of the present invention.

Referring to FIG. 1, the stimulation simulation system using the brain model for the brain lesion patient according to the embodiment of the present invention may include a stimulation simulation server 100 (hereinafter, a "server 100"), a user terminal 200, and an external server 300.

Herein, the stimulation simulation system using the brain model for the brain lesion patient illustrated in FIG. 1 is in accordance with one embodiment. Components thereof are not limited to the embodiment illustrated in FIG. 1, but may be added, changed, or deleted as necessary.

In one embodiment, for the purpose of deriving an optimal treatment strategy in performing the transcranial direct current stimulation (tDCS) that applies the electrical stimulation to the preset target point of the brain of an object (for example, a patient), the server 100 can simulate the stimulation by using the brain model. For example, the server 100 may determine the optimal treatment strategy to accurately apply the electrical stimulation to a specific target point preset in the brain of the object by collecting the brain image of the object, generating the brain model for the object by processing the brain image, and simulating stimulation (for example, the electrical stimulation) by using the generated brain model.

Herein, the optimal treatment strategy may include information about the electrode attachment position that ensues accurately applying the electrical stimulation to the target point preset in the brain of the object. The optimal treatment strategy may include information (namely, a current value, a current application time, or the like) indicating how long how much intensity of a current is to be applied through the electrode attached to each stimulation position as well. But the optimal treatment strategy is not limited thereto.

In various embodiments, the server 100 may be connected to the user terminal 200 through the network 400 and may provide a stimulation simulation service (for example, a service of being input with a brain image of an object and performing a brain model generation operation and a simulation operation by using the brain model) using the brain model for the brain lesion patient to the user terminal 200. In this case, the service provided by the server 100 may be implemented and provided in the form of a web or an application, but the service is not limited thereto.

Herein, in order to execute an application-type service provided by the server 100, the user terminal 200 may include an operating system capable of driving an application, and in order to output a user interface (UI) (for example, a graphic user interface (GUI)) provided by the server 100, the user terminal 200 may be a smartphone including a display in a predetermined area. Herein, the user terminal 200 is a wireless communication device that guarantees portability and mobility and includes all types of handheld-based wireless communication device such as a navigation, a personal communication system (PCS), a global system for mobile communications (GSM), a personal digital cellular (PDC), a personal handphone system (PHS), a personal digital assistant (PDA), an international mobile telecommunication (IMT)-2000, a code division multiple access (CDMA)-2000, a W-code division multiple access (W-CDMA), a wireless broadband internet (Wibro) terminal, a smartphone, a smart pad (Smartpad), and a tablet PC, but the user terminal is not limited thereto.

In addition, herein, the network 400 may have a connection structure capable of exchanging information between respective nodes such as a plurality of terminals and servers. For example, the network 400 includes a local area network (LAN), a wide area network (WAN), the Internet (WWW: World Wide Web), a wired/wireless data communication network, a telephone network, a wired/wireless television communication network, or the like.

In addition, herein, the wireless data communication network includes 3G, 4G, 5G, a third generation partnership project (3GPP), a fifth generation partnership project (5GPP), a long term evolution (LTE), a world interoperability for microwave access (WIMAX), a Wi-Fi, the Internet, a local area network (LAN), a wireless local area network (Wireless LAN), a wide area network (WAN), a personal area network (PAN), a radio frequency (RF), a Bluetooth network, a near-field communication (NFC) network, a satellite broadcasting network, an analog broadcasting network, a digital multimedia broadcasting (DMB) network, or the like, but the wireless data communication network is not limited thereto. In one embodiment, the external server 300 may be connected to the server 100 through the network 400, the server 100 may store and manage information and data necessary for the server 100 to provide the above service, and the server 100 may manage various information and data generated when the server 100 providing the above service.

In various embodiments, the external server 300 may be provided separately outside the server 100 and may be a storage server (for example, an NoSQL-based storage server, a file system-based storage server, a cloud-based storage server, a network-based storage server, or the like) that stores big date converted from various information and data generated as the server 100 provides the above service, but the external server is not limited thereto. Hereinafter, a hardware configuration of the server 100 performing the stimulation simulation method using the brain model for the brain lesion patient will be described with reference to FIG. 2.

Figure 2:
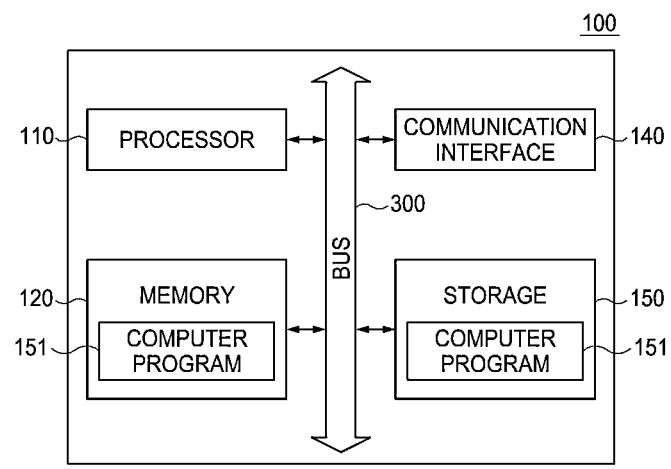
FIG. 2 is a hardware configuration diagram illustrating a stimulation simulation server using a brain model for a brain lesion patient according to another embodiment of the present invention.

FIG. 2 is a hardware configuration diagram illustrating the stimulation simulation server using the brain model for the brain lesion patient according to another embodiment of the present invention.

Referring to FIG. 2, the server 100 according to another embodiment of the present invention may include one or more processors 110, a memory 120 on which a computer program 151 executed by the processor 110 is loaded, a bus 130, a communication interface 140, and a storage 150 which stores the computer program 151. Herein, only components associated with the embodiment of the present invention are illustrated in FIG. 2. Accordingly, a person skilled in the art to which the present invention belongs can know that other general-purpose components other than the components illustrated in FIG. 2 may be further included.

The processor 110 controls the overall operations of each configuration of the server 100. The processor 110 may be configured to include a central processing unit (CPU), a micro process or unit (MPU), a micro controller unit (MCU), a graphic processing unit (GPU), or any type of processors well known in the art of the present invention.

In addition, the processor 110 may perform an operation for at least one application or program for executing the method according to embodiments of the present invention, and the server 100 may include the one or more processors.

In various embodiments, the processor 110 may further include a random access memory (RAM, not illustrated) and a read only memory (ROM, not illustrated) temporarily and/or permanently storing signals (or data) processed inside the processor 110. In addition, the processor 110 may be implemented in a form of a system on chip (SoC) including at least one among a graphic processing unit, a RAM, and a ROM.

The memory 120 stores various data, commands and/or information. The computer program 151 from the storage 150 in order to perform methods/operations according to various embodiments of the present invention is loaded on the memory 120. When the computer program 151 is loaded on the memory 120, the processor 110 may perform the method/operation by performing one or more instructions constituting the computer program 151. The memory 120 may be implemented as a volatile memory such as RAM, but the technical scope of the present disclosure is not limited thereto.

The bus 130 provides a communication function between the components of the server 100. The bus 130 may be implemented as various types of buses such as an address bus, a data bus, and a control bus.

The communication interface 140 supports wired/wireless Internet communication of the server 100. In addition, the communication interface 140 may support various communication methods other than the Internet communication. For this supporting, the communication interface 140 may be configured to include a communication module well known in the technical field of the present invention. In some embodiments, the communication interface 140 may be omitted.

The storage 150 may non-temporarily store the computer program 151. When the stimulation simulation using the brain model for the brain lesion patient is performed through the server 100, the storage 150 may store various types of information necessary to perform the stimulation simulation using the brain model for the brain lesion patient.

The storage 150 may be configured to include a non-volatile memory such as a read only memory (ROM), an erasable programmable ROM (EPROM), an electrically erasable programmable ROM (EEPROM), or a flash memory, a hard disk, a removable disk, a computer-readable recording medium of an arbitrary form well-known in the technical field to which the present invention belongs.

The computer program 151 may include one or more instructions that, when the computer program is loaded on the memory 120, the processor 110 is allowed to perform a method/operation according to various embodiments of the present invention. That is, the processor 110 may perform the method/operation according to various embodiments of the present invention by executing the one or more instructions.

In one embodiment, the computer program 151 may contain one or more instructions to perform the stimulation simulation method using the brain model for the brain lesion patient. The stimulation simulation method includes a step of collecting the brain image of the brain lesion patient, a step of generating the brain model for the brain lesion patient by using the collected brain image, and a step of simulating stimulation to the brain of the brain lesion patient by using the generated brain model.

The steps of the method or algorithm described in relation to the embodiment of the present invention may be implemented directly in hardware, implemented as a software module performed by hardware, or implemented by a combination thereof. The software module may reside in a random access memory (RAM), a read only memory (ROM), an erasable programmable ROM (EPROM), an electrically erasable programmable ROM (EEPROM), a flash memory, a hard disk, a detachable disk, a CD-ROM, or an arbitrary type of a computer-readable recording medium well known in the art to which the present invention belongs.

The components of the present invention may be implemented as a program (or application) to be performed in combination with a computer that is hardware and stored in a medium. The components of the present invention may be implemented as software programming or software components, and similarly, in the embodiments, various algorithms implemented as data structures, processes, routines, or combinations of other programming components are included, and the algorithms can be implemented in a programming or scripting language such as C, C++, Java, or assembler. Functional aspects can be implemented as algorithms performed by one or more processors. Hereinafter, the stimulation simulation method using the brain model for the brain lesion patient performed by the server 100 will be described with reference to FIGS. 3 to 15.

Figure 3:
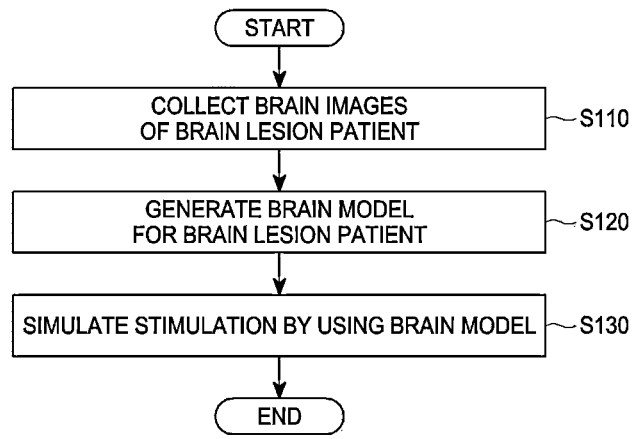
FIG. 3 is a flowchart illustrating a stimulation simulation method using a brain model for a brain lesion patient according to still another embodiment of the present invention.
Figure 4:
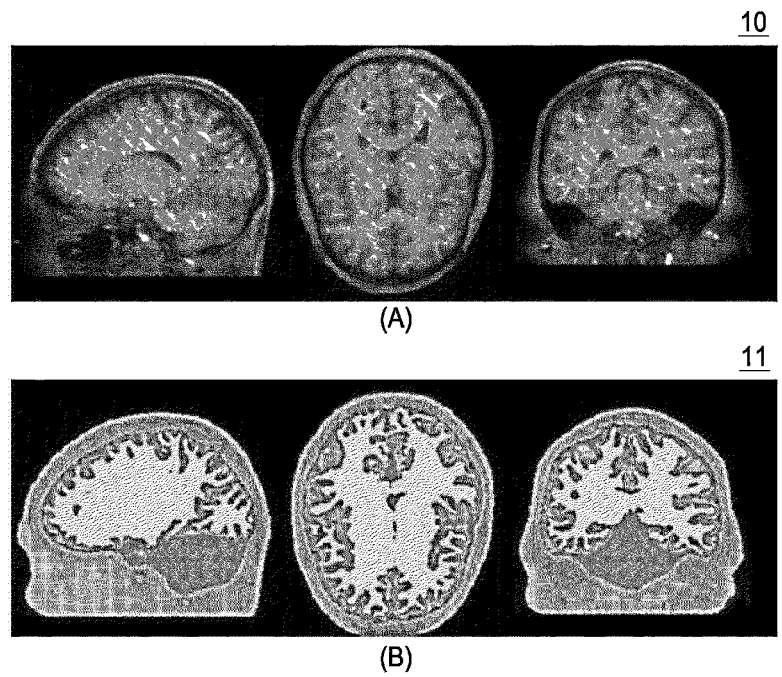
FIG. 4 is an exemplary diagram illustrating a brain image applicable to various embodiments and a result of segmenting the brain image.

FIG. 3 is a flowchart illustrating the stimulation simulation method using the brain model for the brain lesion patient according to still another embodiment of the present invention.

Referring to FIG. 3, in step S110, the server 100 may collect the brain image of the brain lesion patient. Herein, the brain image of the brain lesion patient may denote an MRI image 10 (for example, a T1w MRI image, a T2w MRI image, an FLAIR MRI image, or the like) of the head including the brain of the brain lesion patient as illustrated in FIG. 4A. That is, the brain image of the brain lesion patient may include not only the brain of the brain lesion patient but also the skull and scalp of the object.

In various embodiments, the server 100 may be connected to a computer that is a workstation connected to an MRI image acquisition device and may acquire a brain MRI image of the brain lesion patient imaged by the MRI image acquisition device through the computer. However, the present invention is not limited thereto, but various types of images such as CT images may be applied to the brain image of the brain lesion patient, and the brain image may be collected with various methods such as a method of being directly input with the brain image from the user through the UI provided to the user terminal 200.

In step S120, the server 100 may generate a brain model (for example, a three-dimensional brain model) for the brain lesion patient by using the brain images of the brain lesion patients collected through the step S110. Hereinafter, the brain model generation operation of the brain lesion patient performed by the server 100 will be described with reference to FIGS. 5 to 7.

Figure 5:
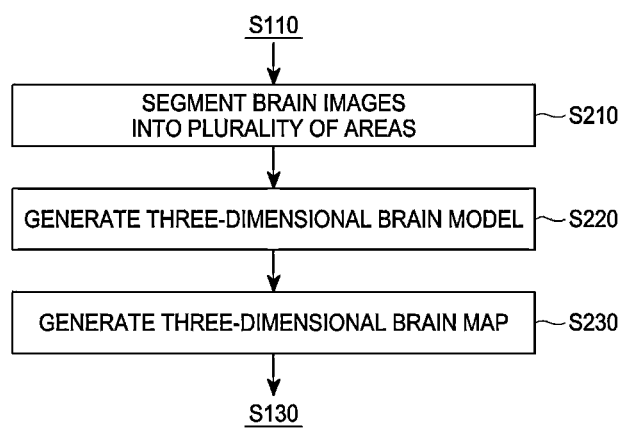
FIG. 5 is a flowchart illustrating a method for generating a three-dimensional brain map for stimulation simulation, in various embodiments.

FIG. 5 is a flowchart illustrating a method for generating the three-dimensional brain map for the stimulation simulation in various embodiments.

Referring to FIG. 5, in step S210, the server 100 may segment the brain image of the brain lesion patient into a plurality of areas (for example, 11 in FIG. 4B).

Herein, the plurality of area may include a plurality of first areas corresponding to each of the structures of the brain and one or more second areas corresponding to the brain lesions, but the plurality of area are not limited thereto. For example, the server 100 may segment the brain image of the brain lesion patient into eight first areas (for example, a large brain area, a small brain area, a gray matter area, a white matter area, a brain spinal fluid area, a skull area, a scalp area, and a brain chamber area) according to the brain structure and a second area corresponding to the brain lesion and, in other words, may segment the brain image of the brain lesion patient into a total of nine areas.

Herein, a total of 9 areas are only an example of a case where there is one second area corresponding to the brain lesion or two or more second areas adjacent to each other can be expressed as one area, but the present invention is not limited thereto. When two or more second areas are separated by a predetermined distance so as not to be expressed as one area, the brain image can be segmented into (8+N) areas (where 8 is the number of first areas segmented according to the brain structure and N is the number of second areas required to be independently segmented according to the position of the brain lesion) by individually segmenting each of two or more second areas.

In various embodiments, the server 100 may select one or more first areas having the same attributes as one or more second areas among the plurality of first areas and can combine the selected one or more first areas and the one or more second areas as one area.

In general, in the case of a brain lesion such as a cerebral apoplexy, as the brain lesion progresses, the area where the brain lesion occurred becomes necrotic, and cerebrospinal fluid fills up the necrotic area, so that the area corresponding to the brain lesion and the area that the cerebrospinal fluid fills have the same physical properties.

In consideration of this point, the server 100 segments the brain image of the brain lesion patient into the above nine areas according to the brain structure, and when the attribute of one or more second areas is the same as the attribute of any one first area, that is, when one or more second areas and the area that the cerebrospinal fluid fills have the same physical properties as the brain lesion progresses, the brain image may be segmented into eight areas by combining one or more second areas and the area that the cerebrospinal fluid fills as one area.

In various embodiments, the server 100 may perform post-processing on the brain image segmented into the plurality of areas for more accurate modeling before generating the three-dimensional brain model by using the brain image segmented into the plurality of areas.

Figure 6:
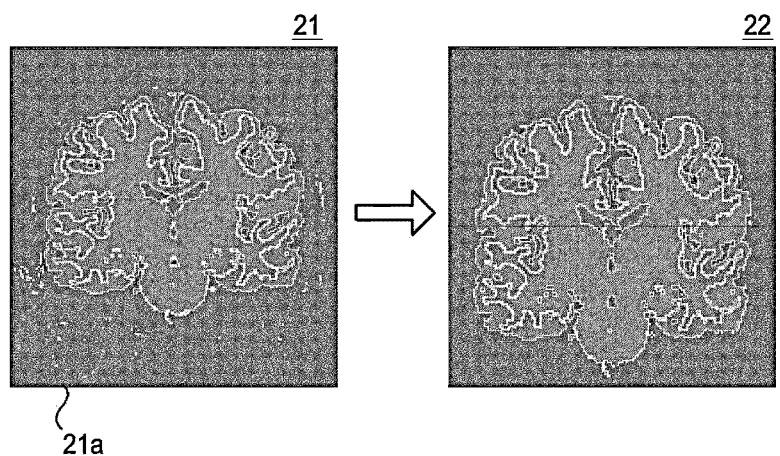
FIG. 6 is a diagram illustrating a process of removing noise in an MRI image segmented into the plurality of areas by performing noise rejection based on a connected component in various embodiments.

First, referring to FIG. 6, the server 100 may perform connected component-based noise rejection on the brain image segmented into the plurality of areas.

Herein, the connected component-based noise rejection can be utilized in the process of improving the result of the brain image segmentation performed by using the convolutional neural network (CNN). For example, the server 100 may generate the brain image 22 from which noise has been removed by removing the remaining components 21a except for the biggest chunk from the brain image 21 segmented into the plurality of areas as illustrated in FIG. 6.

Herein, various techniques are known in relation to the method for performing the connected component-based noise rejection, and these various known techniques can be selectively applied depending on the situation. In the present specification, the connected component-based noise rejection method performed by the server 100 is not specifically disclosed.

Figure 7:
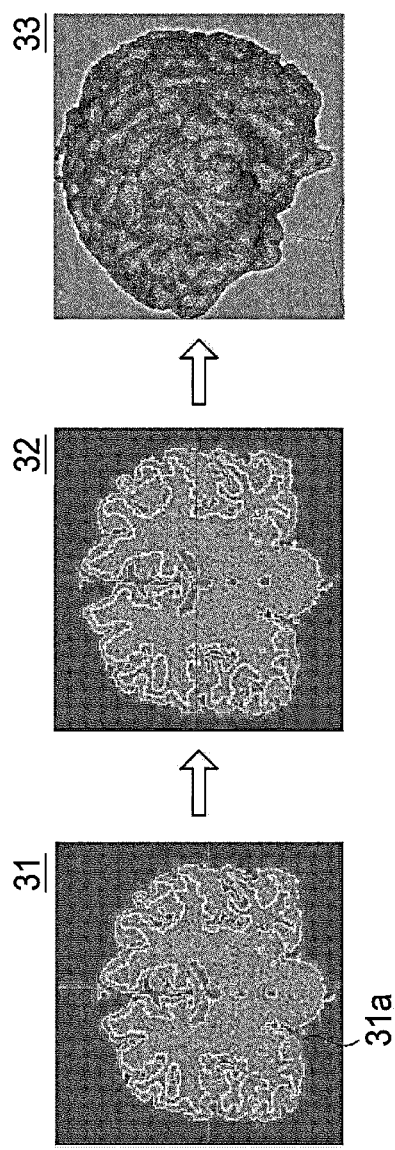
FIG. 7 is a diagram illustrating a process for generating a three-dimensional brain model by performing hole rejection processing on an MRI image segmented into the plurality of areas in various embodiments.

After that, referring to FIG. 7, the server 100 may perform the hole rejection on the MRI image segmented into the plurality of areas. Herein, the hole rejection can be used to reject a hole which is one of the errors in convolutional neural network-based segmentation. For example, the server 100 may generate the MRI image 32 from which the holes are rejected by rejecting at least a portion of the holes 31a included in the MRI image 31 segmented into the plurality of areas.

Herein, with respect to the method for performing the hole rejection, various techniques are known as in the method for performing the connected component-based noise rejection, and these various known techniques can be selectively applied depending on the situation. Therefore, in the present specification, the method of allowing the server 100 to perform the hole rejection is not specifically disclosed.

In step S220, the server 100 may generate the three-dimensional brain model (for example, 33 in FIG. 7) by using the brain image segmented into the plurality of areas.

Herein, various techniques for generating a three-dimensional model by modeling a two-dimensional image have been previously known (for example, (1) Dae-Geon Lee, Eun-Jin Yoo, and Cheon Lee, (2015), Three-dimensional visualization of brain surface using MRI images, Korea Proceedings of the Society of Surveying and Surveying Conference, (Page 4), 191-194, (2) Kim Young-cheol, Moon Chi-woong, Choi Heung-guk, (2003), Three-dimensional visualization of brain area in MRI images, (Page 4) (389-392)), and these various known techniques may be selectively applied depending on the situation. In this specification, a method of generating the three-dimensional brain model by performing three-dimensional modeling the brain image performed by the server 100 is not specifically disclosed.

In various embodiments, the server 100 can perform an operation of segmenting the brain image by using the big data collected and stored as stimulation is simulated by using the pre-trained AI model or the plurality of brain models corresponding to the plurality of users (step S210)) and an operation of generating the three-dimensional brain model (step S220). Hereinafter, various embodiments of the brain image segmentation operation and the three-dimensional brain model generation operation performed by the server 100 will be described with reference to FIGS. 8 to 10.

Figure 8:
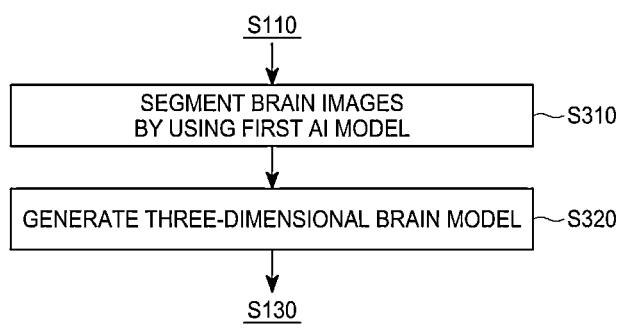
FIG. 8 is a flowchart illustrating a method of generating a three-dimensional brain model by using a first AI model in various embodiments.

FIG. 8 is a flowchart illustrating a method of generating the three-dimensional brain model by using a first AI model in various embodiments.

Referring to FIG. 8, in step S310, the server 100 may segment the brain image into the plurality of areas by using the pre-trained first AI model.

Herein, the pre-trained first AI model is a model trained by using the plurality of brain images which are segmented into the plurality of areas as learning data. Information about each of the segmented plurality of areas is labeled in each of the plurality of areas.

Herein, the pre-trained AI model includes one or more batch normalization layers, activation layers, and convolution layers. The pre-trained AI model may be a model learned using a machine learning-based learning method (e.g., Supervision Learning) or Deep Learning, but is not limited thereto. The pre-trained AI model may be input with an original brain image that is not segmented into a plurality of areas and output a brain image segmented into a plurality of areas.

In addition, the pre-trained first AI model may be configured to include a horizontal pipeline configured with a plurality of blocks for extracting high-level properties from low-level properties of the brain image and a vertical pipeline that performs the segmentation by collecting the properties extracted from the horizontal pipelines, and perform segmentation on the brain image with relatively poor quality, but the present invention is not limited thereto.

In various embodiments, the server 100 segments the brain image respectively by using two first AI models in which the brain image is segmented according to different standard and can generate a new brain image segmented into the plurality of areas by combining the respective segmented brain images. For example, the server 100 may segment the brain image into the plurality of first areas by using the first AI model that segments the brain image according to the structure of the brain, may segment the brain image into one or more second areas by using the first AI model that segments the brain image into the areas corresponding to the brain lesion and the areas not corresponding to the brain lesion, and may generate the brain image segmented into the plurality of first area and the one or more second areas by combining the two segmented brain images.

In various embodiments, the server 100 can segment each of the brain images by using two or more first AI models that segments the brain image according to the same standard and can generate one segmented brain images by combining the segmented brain images. However, the present invention is not limited thereto.

In step S320, the server 100 may generate the three-dimensional brain model by using the brain image segmented into the plurality of areas through step S310. For example, the server 100 can generate the three-dimensional brain model by performing three-dimensional modeling of the brain of the brain lesion patient by using the brain image segmented into the plurality of areas according to the above method.

Herein, the three-dimensional brain model generation method performed by the server 100 may be implemented in the same or similar form as the three-dimensional brain model generation method (step S220) of FIG. 5, but the present invention is not limited thereto.

Figure 9:
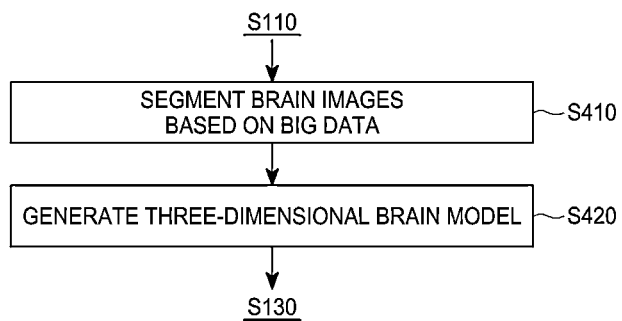
FIG. 9 is a flowchart illustrating a method of generating a three-dimensional brain model by using big data in various embodiments.

FIG. 9 is a flowchart illustrating a method of generating the three-dimensional brain model by using big data in various embodiments.

Referring to FIG. 9, in step S410, the server 100 may segment the brain image into the plurality of areas by using pre-stored big data.

Herein, the pre-stored big data may denote stored big data of the plurality of brain images corresponding to each of the plurality of patients, the plurality of brain models corresponding to each of the brain images, and the result of the plurality of simulations which is derived through the simulation of the stimulation by using the plurality of brain models. However, the big data is not limited thereto, and the big data may further include various data such as information (age, gender, race, or the like) about a plurality of the patient, information (type, progress, size, position, shape, or the like) about the brain lesion the patient suffers, treatment strategies (position and intensity of the electrical stimulation, treatment cycle and frequency, or the like) for the brain lesion.

First, the server 100 can construct a big data system to segment the brain image into the plurality of areas based on the big data. For example, the server 100 can collect the data including at least one of the information about the plurality of brain lesion patients, the plurality of brain images corresponding to each of the plurality of brain lesion patients, the plurality of brain models corresponding to each of the plurality of brain images, and the plurality of simulation results derived by simulating the stimulation by using each of the plurality of brain models, and the server 100 can construct a big data system by storing the collected data according to the big data based data storing method. However, the type of data to be collected is not limited to the above, and the data may further include information (for example, the target point on the brain to be stimulated for treatment of the brain lesion of the brain lesion patient, the optimal stimulation position combination according to the preset guide system (for example, 10-20 system) for applying the stimulation to the target point, and the intensity of stimulation (for example, the current value) to be applied to each of the one or more optimal stimulation positions included in the optimal stimulation position combination) about the plurality of treatment strategies established based on the result of the plurality of simulations.

Herein, as the big data-based data collection and storage method, various technologies are known (for example, big data collection technology (log collection, crawling, sensing, RSS, or Open API) and big data storage technology (NoSQL, File System, cloud, or network)), and these various known techniques can be selectively applied depending on the situation. In this specification, a method of collecting and storing data based on big data performed by the server 100 is not specifically disclosed.

After that, the server 100 can collect information (for example, race, age, gender, and the like) on the brain lesion patient as basic information. For example, the server 100 may provide a UI to the user terminal 200 and may be input with information on the brain lesion patient who is to generate a brain model through the UI, but the present invention is not limited thereto.

After that, the server 100 can extract one or more data corresponding to the information on the brain lesion patient from the big data pre-stored on the big data system constructed in advance. For example, when the server 100 is input with information on race, age, and gender of the first brain lesion patient, the server 100 can extract, from the pre-stored big data, the data (for example, one or more brain image of second brain lesion patients (original brain images, the brain images segmented into the plurality of areas, and brain model to which the brain lesion areas are applied) about the one or more second brain lesion patients with the same (or similar) race, age and gender as the first brain lesion patient). However, the present invention is not limited thereto.

Herein, as the method of extracting specific data from the pre-stored big data, various technologies have been previously known (for example, big data processing technology (a method of extracting result values through a query in a large-capacity database and a method of extracting result values through real-time processing)), and these various known techniques can be selectively applied depending on the situation, and thus, in this specification, the big data processing method performed by the server 100 is not specifically disclosed.

After that, the server 100 may segment the brain image of the first brain lesion patient into the plurality of areas by using the extracted data for one or more second brain lesion patients. For example, the attributes (for example, position, size, shape, and the like) of each of the plurality of areas for segmenting the brain image by comparing the original brain image of the one or more second brain lesion patients with the brain image segmented into the plurality of areas can be determined, and the brain image of the first brain lesion patient can be segmented by using the attributes of each of the determined plurality of areas.

In various embodiments, the server 100 may provide the result (for example, the brain image segmented into the plurality of areas) generated by segmenting the brain image of the first brain lesion patient into the plurality of areas by using the big data to the user terminal 200, may be input with feedback information (for example, suitability of the brain image segmented into the plurality of areas, a correction request, confirmation, or the like) as a response to this, and can correct or confirm the brain image segmented into the plurality of areas based on the input feedback information.

In various embodiments, the server 100 can collect an original brain image of the first brain lesion patient, the brain image of the first brain lesion patient segmented into the plurality of areas generated by segmenting the original brain image using big data, the feedback information input from the user, the brain model generated by using the brain image of the first brain lesion patient segmented into the plurality of areas (for example, step S420 to be described later), and the result of the simulation derived while performing the simulation by using the brain model for the first brain lesion patient (for example, step S130 to be described later) and can store these data in the big data system.

In step S420, the server 100 may generate the three-dimensional brain model by using the brain image segmented into the plurality of areas through step S410. For example, the server 100 can generate he three-dimensional brain model by performing three-dimensional modeling of the brain of the brain lesion patient by using the brain image segmented into the plurality of areas according to the above method.

Herein, the three-dimensional brain model generation method performed by the server 100 may be implemented in the same or similar form as the three-dimensional brain model generation method (step S220) of FIG. 5, but the present invention is not limited thereto.

In various embodiments, the server 100 may verify the brain image segmented into the plurality of areas by using the big data.

First, the server 100 may generate the brain image segmented into the plurality of areas by segmenting the brain image into the plurality of areas by using the first AI model (for example, step S310 of FIG. 8).

After that, the server 100 can collect information (for example, race, age, gender, and the like) about the brain lesion patient as basic information and can extract one or more data (for example, the segmented brain image data of the second brain lesion patient who has the same or similar race, gender and age as the first brain lesion patient) corresponding to the information on the brain lesion patient collected from the stored big data based on the collected information on the brain lesion patient.

After that, the server 100 can calculate the degree of similarity between the segmented brain image of the second brain lesion patient of the same or similar race, gender, and age as the first brain lesion patient and the segmented brain image of the first brain lesion patient and can verify the brain image segmented into the plurality of areas by determining whether the calculated degree of similarity is larger than or equal to a reference value.

In various embodiments, the server 100 may overlay the segmented brain image of the first brain lesion patient and the segmented brain image of the second brain lesion patient, may analyze the overlaid two brain images (the brain image of the first brain lesion patient and the brain image of the second brain lesion patient), may calculate a ratio of the overlapping area of each of the plurality of areas included in the segmented brain image of the first brain lesion patient and the plurality of areas included in the segmented brain image of the second brain lesion patient with respect to the entire area of the brain, and may calculate the similarity between the segmented brain image of the first brain lesion patient and the segmented brain image of the second brain lesion patient by using the calculated ratio. However, the present invention is not limited thereto, and various techniques of determining how a degree of the similarity is by comparing the sizes, the positions, and the shapes between the plurality of areas included in the segmented brain image of the first brain lesion patient and the plurality of areas included in the segmented brain image of the second brain lesion patient can be applied.

In various embodiments, when the calculated similarity is larger than or equal to the reference value, the server 100 determines that the brain image of the first brain lesion patient segmented into the plurality of areas is correctly segmented and may generate the brain model for the first brain lesion patient by using the corresponding brain image. On the other hand, when the calculated similarity is smaller than the reference value, the server 100 may perform the process of segmenting the brain image of the first brain lesion patient into the plurality of areas again (repeat until the similarity becomes larger than or equal to the reference value).

Figure 10:
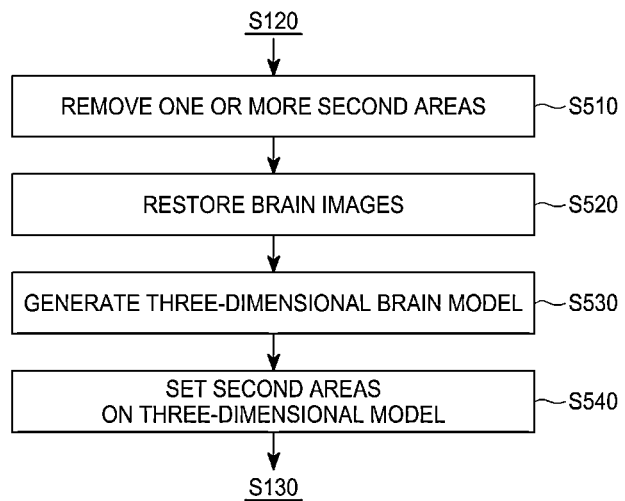
FIG. 10 is a flowchart illustrating a method of generating a three-dimensional brain model in which a brain lesion area is set using a second AI model in various embodiments.

FIG. 10 is a flowchart illustrating a method of generating the three-dimensional brain model in which a brain lesion area is set by using a second AI model in various embodiments.

Referring to FIG. 10, in step S510, the server 100 may generate the brain image segmented into the plurality of areas by segmenting the brain image into the plurality of areas by using the first AI model and may remove one or more second areas corresponding to the brain lesion area among the plurality of areas included in the segmented brain image.

In various embodiments, the server 100 may remove one or more second areas from the brain image by erasing a portion corresponding to one or more second areas among the plurality of areas included in the brain image from within the brain image.

In various embodiments, the server 100 may perform image processing by inserting an object of a preset shape into a portion corresponding to one or more second areas among the plurality of areas included in the brain image, or by displaying a portion corresponding to one or more second areas with a color set in advance so that a portion corresponding to one or more second areas on the brain image is covered.

In step S520, the server 100 may restore the brain image from which the one or more second areas have been removed through step S510.

Herein, the restoring the brain image may denote correcting the brain image from which the one or more second areas have been removed so as to be the brain image of a normal person without brain lesions by filling in at least a portion of the brain image from which the one or more second areas have been removed with elements that need to originally exist. For example, when one or more second areas is located in at least a portion of the cerebrum and at least a portion of the cerebrum is erased as one or more second areas is removed from the brain image, the server 100 can restore the brain image in which at least a portion has been erased by filling the at least a portion of the cerebrum which is a component that should originally exist in the at least a portion erased on the brain image.

In various embodiments, the server 100 may restore the brain image in which one or more second areas have been removed by using the pre-trained second AI model.

Herein, the pre-trained second AI model may be a model trained by using, as the training data, the plurality of brain images from which at least some areas are removed and the plurality of brain images from which at least some areas are not removed. For example, the pre-trained second AI model may be a GAN model, and may be a model in which the brain image from which at least some areas have been removed is input and the brain image in which at least some areas have been restored is output.

Herein, various techniques for image restoration using a GAN model have been previously known (for example, Moon, C., Uh, Y., & Byun, H., (2018), "restoration of damaged image using adversarial generative neural network", Korea Broadcasting Engineers Association Journal, 23(4), 503-510)), and these various known techniques can be selectively applied depending on the situation, so that in this specification, a method of restoring the brain image by using a GAN model performed by the server 100 not specifically disclosed.

In step S530, the server 100 may generate the three-dimensional brain model by using the brain image restored through step S520. Herein, the method of generating the three-dimensional brain model by using the restored brain image may be implemented in the same or similar form as the three-dimensional brain model generation method performed in step S220 of FIG. 5, but the method is not limited thereto.

In step S540, the server 100 can generate the three-dimensional brain model to which the brain lesion area is applied by setting the one or more second areas on the three-dimensional brain model generated in step S530 based on the attributes (for example, size, position, shape, and the like) of the one or more second areas removed through step S510.

In various embodiments, the server 100 can display the brain lesion area on the three-dimensional brain model by matching the brain lesion area generated according to the size and the shape of the one or more second areas on the three-dimensional brain model generated by using the brain image restored based on the positions of the one or more second areas.

In various embodiments, the server 100 can generate the brain lesion model by independently modeling the one or more second areas removed through step S510 and can generate the three-dimensional brain model to which the brain lesion area is applied by matching the three-dimensional brain model generated in step S530 with the brain lesion model based on attributes (for example, size, position, shape, and the like) of the one or more second areas.

In general, in the case of the brain lesion such as a cerebral apoplexy, a specific tumor like cancer does not occur, but rather a portion of the brain is damaged or crushed. Therefore, in many cases, the brain lesion area in the brain image is expressed in a form without a structure required to originally exist in the brain image. There is a problem in that, when a portion of area (brain lesion area) in the brain image is expressed in a form without a structure in this manner, each structure cannot be accurately identified in the process of analyzing and segmenting the brain image, so that it is difficult to accurately segment the brain image into the plurality of areas and, thus, it is difficult to construct an accurate brain model.

There is an advantage in that, for the purpose of overcoming this problem, the server 100 can generate an accurate brain model by removing the area itself corresponding to the brain lesion that interferes with the segmentation of the brain image into the plurality of areas, generating a normal brain image by restoring the removed area, and generating the brain model using this. And the server 100 can accurately generate the brain model reflecting the brain lesion area as a tool for simulating the brain stimulation to the brain lesion patient by setting the area corresponding to the brain lesion on the brain model generated later or by generating the three-dimensional brain model reflecting the brain lesion area by matching the brain lesion model generated by independently modeling the area corresponding to the brain lesion with the corresponding brain model.

Referring to FIG. 5 again, in step S230, the server 100 can generate a three-dimensional brain map configured with a plurality of meshes where the delivery process of the electrical stimulation can be simulated based on an attribute for each of the plurality of areas included in the three-dimensional brain model (the three-dimensional brain model reflecting the brain lesion area) generated through the step S220.

For example, the server 100 may generate a three-dimensional spectroscopic image configured with a plurality of volumetric meshes including a tetrahedron or a hexahedron and may generate a three-dimensional stereoscopic image configured with a plurality of surface meshes including a triangle or a quadrangle, but the present invention is not limited thereto. The type of meshes constituting the three-dimensional stereoscopic image may be set differently depending on the purpose of simulation.

The brain model generated according to the stimulation simulation method using the brain model for the brain lesion patient according to various embodiments of the present invention is described that, for the purpose of simulating the electrical stimulation to the brain lesion patient, the brain model is generated by reflecting the actual brain shape of the brain lesion patient based on the brain image actually collected from the brain lesion patient, but the present invention is not limited thereto. The brain model may be generated and provided in various forms and methods according to various purposes for using the brain model.

More specifically, in various embodiments, the server 100 does not collect brain images from actual patients, but brain models standardized according to gender, race, and age based on brain lesion statistical data by gender, race, and age for a plurality of users may be generated. The server 100 may generate brain lesion information having arbitrary attributes (for example, brain lesion type, progress, shape, size, position, or the like) and reflect it on a standardized brain model, thereby generating a virtual brain model (dummy model) reflecting brain lesion information having an arbitrary attribute.

Herein, the statistical data may be data statistically obtained from clinical data on which brain lesion occurs in which position and in which form according to the gender, race, and age of the user based on the big data stored in the big data system, but the present invention is not limited thereto.

In other words, data for brain lesion research can be constructed by generating the brain lesion model by using statistical data by age, gender, and race occurring in clinical practice and generating a large number of virtual brain models reflecting the brain lesion by applying the brain lesion model to a brain model for a normal person.

In addition, there is an advantage in that, as the AI model is learned by using the virtual brain model (for example, the first AI model and the second AI model) generated according to the above method as training data for the AI model, the performance of the AI model is improved, and more accurate results can be obtained.

Referring to FIG. 3 again, in step S130, the server 100 can simulate the electrical stimulation based on the plurality of stimulation positions according to the preset guide system by using the three-dimensional brain model (for example, the three-dimensional brain map) generated through the above process.

Figure 11:
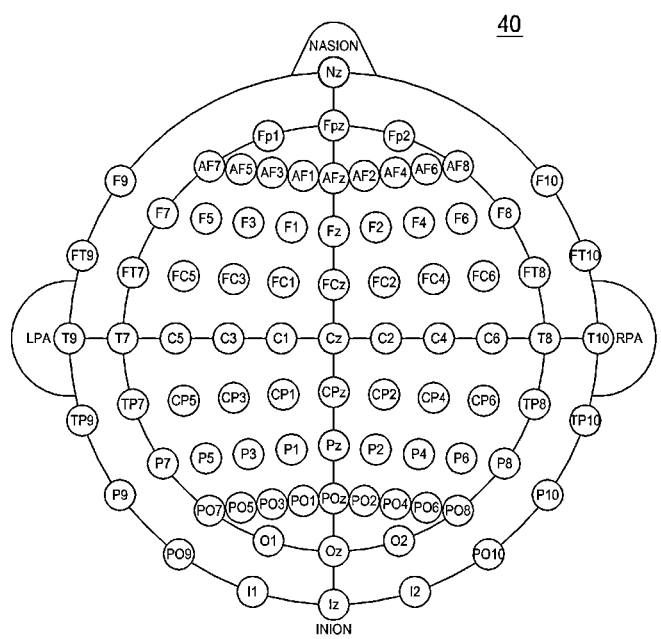
FIG. 11 is an exemplary diagram illustrating a plurality of stimulation positions according to a preset guide system applicable to various embodiments.

Herein, the preset guide system defines the plurality of stimulation positions for the brain of the object in advance in order to guide the transcranial direct current stimulation method and may denote a system of guiding the electrode attachment positions so that the electrical stimulation is applied to the target points of the brain. For example, as illustrated in FIG. 11, the preset guide system may be a brain wave measurement 10-20 system 40 according to the international 10-20 system standard electrode attachment method, and the plurality of stimulation positions may denote positions in which a plurality of brain wave measuring channels (19, 24, 68, 128, or 256 caps or individual electrodes) are attached to the head of the object according to the 10-20 system, but the present invention is not limited thereto.

In various embodiments, the server 100 may generate pre-calculation information by precomputing some calculation processes of simulation in advance to improve the efficiency of simulation processing such as increasing the speed of calculation of the simulation, or the like. Therefore, the electrical stimulation for the plurality of stimulation positions can be simulated.

First, as pre-calculation information, the server 100 may acquire physical properties of each of the plurality of areas for simulating the flow of current according to the electrical stimulation to the brain of the object.

Herein, the physical property may be electrical conductivity (for example, at least one of isotropic electrical conductivity and anisotropic electrical conductivity of each of the plurality of areas), but the present invention is not limited thereto.

In various embodiments, the server 100 may allocate an electrical conductivity known through an experiment to each of the segmented plurality of areas (for example, white matter; 0.126 S/m, gray matter; 0.276 S/m, brain spinal fluid; 1.65 S/m, skull; 0.01 S/m, and skin; 0.465 S/m).

In addition, the server 100 may acquire anisotropic electrical conductivity for each of the plurality of areas from the MRI image including the conduction tensor image for the brain of the object. For example, the server 100 may acquire anisotropic electrical conductivity according to the direction of the nerve fiber included in the diffusion tensor image in consideration that the eigenvector of the diffusion tensor image coincides with the eigenvector of the conduction tensor.

After that, the server 100 may set one of the plurality of stimulation positions as the reference stimulation position and may perform the simulation while changing the remaining stimulation positions except for the reference stimulation position among the plurality of stimulation positions based on the set reference stimulation position.

For example, the server 100 may calculate the coordinate system of the preset guide system (for example, the 10-20 system) based on the head shape image of the object. After that, the server 100 can perform the simulation by setting the reference stimulation position among the plurality of stimulation positions and by configuring the set reference stimulation position and at least one stimulation position among the remaining stimulation positions (the remaining stimulation position excluding the reference stimulation position among the plurality of stimulation positions) as one stimulation position combination.

That is, the server 100 can acquire stimulation result by determining a combination of the stimulation positions including the reference stimulation position and at least one stimulation position among the remaining stimulation positions excluding the reference stimulation position and by performing the simulation on each stimulation position combination.

In various embodiments, the server 100 may arbitrarily select two or more stimulation positions among the plurality of stimulation positions and may acquire the stimulation result by performing the simulations for the arbitrarily selected two or more stimulation positions.

Herein, the server 100 simulates the electrical stimulation by using a three-dimensional brain map configured with a plurality of meshes. The simulation for a plurality of stimulation positions may be performed by using at least one method among a finite element method (FEM), finite difference method (FDM), and finite volume method (FVM) using a three-dimensional model having a lattice structure but the present invention is not limited thereto.

After that, the server 100 can derive a linear relationship for each of the plurality of stimulation positions as pre-calculation information for the simulation by using the result of the simulation generated by applying the electrical stimulation to each of the plurality of stimulation positions according to the preset guide system.

For example, the result of the stimulation collected by applying the electrical stimulation to each of the plurality of stimulation positions has the linear property, and the server 100 may derive the linear relationship between the plurality of stimulation positions by using the result of the stimulation collected by applying the electrical stimulation to each of the plurality of stimulation positions. For example, since the electric field and the current density due to the stimulation have the linear relationship, the linear relationship can be derived as expressed in Mathematical Formula 1 below.

$$E(C1_a, C2_b, C3_{-a-b}) = E(C1_a, C3_{-a}) + E(C2_b, C3_{-b}) \quad \text{<Mathematical Formula 1>}$$

Herein, $E(C1_a, C2_b)$ may be the brain current distribution when a and b currents are applied to C1 which is the first stimulation position and C2 which is the second stimulation position, respectively.

That is, by using the linear relationship as in Mathematical Formula 1 above, the linear equation in a form Ax=E can be derived (where x is an amount of current applied to the stimulation position, and E is an electric field value), and a desired E value, that is, an electric field value can be calculated linearly adjusting the value x.

Wherein x value is an M×1 matrix (where M is the number of stimulation positions (or electrodes) used in the simulation), E is an N×1 matrix (where N is the number of nodes included in the three-dimensional brain map), and A is an N×M matrix (where each column of the N×M matrix is a pre-calculation result). That is, the server 100 can calculate the matrix A as the linear relationship for each of the plurality of stimulation positions, that is, as the pre-calculation information.

In various embodiments, when the number of the plurality of stimulation positions is n, the server 100 may derive the linear relationship for each of the plurality of stimulation positions by only n−1 simulations. For example, when the simulation is performed for a total of three stimulation positions (for example, the first stimulation position, the second stimulation position, and the third stimulation position), since the linear relationship can be derived for the second and third stimulation positions from the result of the simulations for the first and second stimulation positions and from the result of the simulations for the first and third stimulation positions, the linear relationship for each of the three stimulation positions can be derived through only two times of the simulations for a total of the three stimulation positions.

In various embodiments, the server 100 can filter the stimulation positions corresponding to the preset condition among the plurality of stimulation positions and can simulate the electrical stimulation to the brain of the object by using the remaining stimulation positions except for the filtered stimulation positions among the plurality of stimulation positions. Hereinafter, the embodiment will be described with reference to FIGS. 12 to 15.

Figure 12:
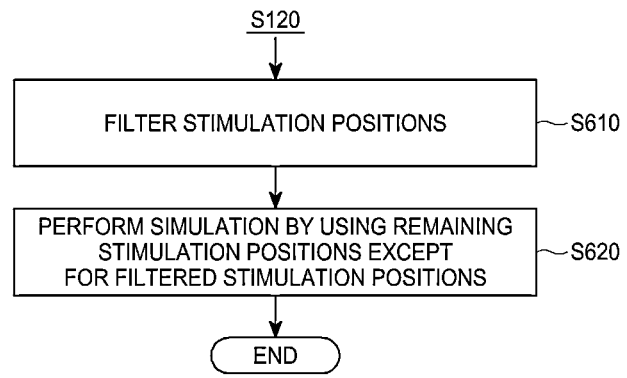
FIG. 12 is a flowchart illustrating a method for simulating the electrical stimulation by filtering stimulation positions in various embodiments.

FIG. 12 is a flowchart illustrating method for simulating the electrical stimulation by filtering the stimulation positions in various embodiments.

Referring to FIG. 12, in step S610, the server 100 may filter the stimulation positions corresponding to the preset condition among the plurality of stimulation positions according to the preset guide system.

In various embodiments, the server 100 may filter at least one stimulation position by using the head image of the object.

First, the server 100 may acquire a head image generated by photographing the head of the object and may set one or more reference stimulation positions based on the acquired head image. For example, the server 100 may provide the first UI (for example, 50 in FIG. 15) to the user terminal 200, may output the plurality of stimulation positions according to the preset guide system through the first UI, and may set the reference stimulation position by allowing the one or more stimulation positions among the output plurality of stimulation positions to be selected as the reference stimulation position. However, the present invention is not limited thereto, and various methods such as a method of automatically setting the reference stimulation position for calculating the plurality of stimulation positions according to the preset guide system by performing the image analysis of the head image of the object may be applied.

After that, the server 100 may set the plurality of stimulation positions based on one or more reference stimulation positions. For example, in the case where the total number of reference stimulation positions set according to the above method is four and the four stimulation positions corresponding to the nasion, the inion, the left pre-auricle, and the right pre-auricle of each object are Nz, Iz, LPA, and RPA, the first server 100 can calculate the point where the first connecting line that connects the stimulation positions Nz and Iz and the second connecting line that connects the stimulation positions LPA and RPA intersects as the central coordinate and can derive the coordinate system for the plurality of stimulation positions according to the 10-20 system using the distance information on the first and second connecting lines based on the central coordinate. As an example, the first server 100 may derive the coordinate system of the 10-20 system so as to have a position where the first connection line and the second connection line are segmented with distances of 10% or 20%, respectively, based on the central coordinate.

Thereafter, the server 100 may set a filtering target area (for example, an area serving as a reference for filtering the stimulation position) by using the plurality of stimulation positions set on the head image and may filter at least one stimulation positions based on the set filtering target area.

Figure 13:
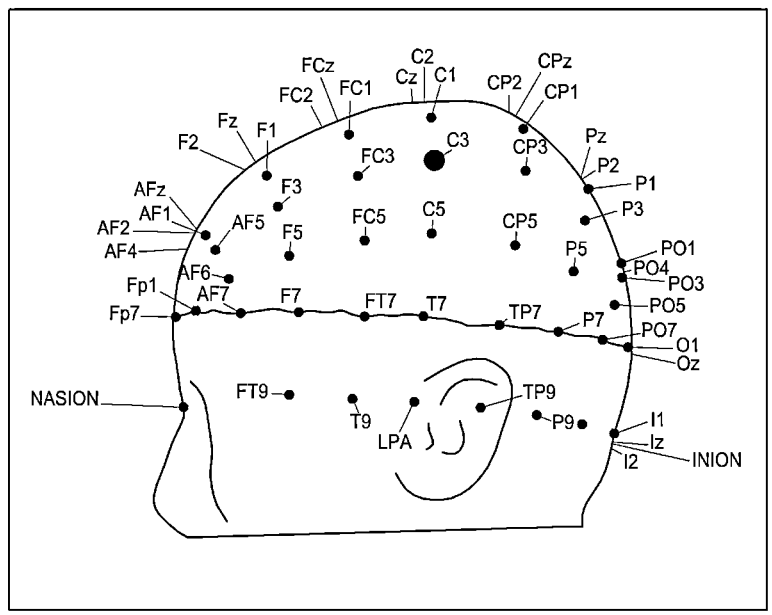
FIG. 13 is an exemplary diagram illustrating a form of filtering at least one stimulation position by setting a filtering target area in various embodiments.

In various embodiments, the server 100 sets a plane containing one or more reference stimulation positions as the filtering target area and can filter at least one stimulation position located on the plane set as the filtering target area based on the plane set as the filtering target area. For example, as illustrated in FIG. 13, in the case where one or more reference stimulation positions are the four stimulation positions Nz, Iz, LPA, and RPA corresponding to the nasion, the inion, the left pre-auricle, and the right pre-auricle, the server 100 can set the plane including Nz, Iz, LPA, and RPA as the filtering target area and can filter all the stimulation positions located on the plane including Nz, Iz, LPA, and RPA.

In various embodiments, the server 100 may filter all the stimulation positions located at the bottom of the corresponding plane based on the plane set as the filtering target area. For example, when one or more reference stimulation positions set by the user are Fpz, T7, Oz, and T10, the first server 100 can filter the stimulation positions Nz, Iz, LPA, and RPA located at the bottom of the plane including Fpz, T7, Oz, and T10.

That is, due to the shape of the head or the ear, it is difficult to attach the electrode to the stimulation positions corresponding to the nasal muscles, the laryngeal pole, the left ear, and the right ear, or it is difficult to attach the electrode to the correct position even if the electrode is attached. Therefore, the stimulation positions corresponding to these positions need to be filtered.

In various embodiments, the server 100 can detect an area in which the electrodes cannot be attached on the head of the object by analyzing the head image, can set the detected area in which the electrodes cannot be attached as a filtering target area, and can filter at least one stimulation position included on the filtering target area. For example, when there is an area with a metallic substance (clip, coil, metabolic foreign body, or the like) on the brain of the object or when there is an injury such as a scalp disease or wound, there is a problem in that it is difficult to attach the electrodes to the area and apply the electrical stimulation. In consideration of this problem, the server 100 can detect the area in which the electrodes cannot be attached as described above by analyzing the head image of the object through image analysis and can filter the stimulation positions included in the detected area.

In step S620, the server 100 may simulate the electrical stimulation to the brain of the object by using the remaining stimulation positions except for the filtered stimulation positions among the plurality of stimulation positions. Herein, the method of simulating the electrical stimulation to the brain of the object using the remaining stimulation positions except for the filtered stimulation positions can be performed by using at least one method of the finite element method, the finite difference method, and the finite volume method as described above.

In various embodiments, the server 100 may segment the brain of the object into two areas, that is, segment the brain into the left hemisphere area and the right hemisphere area and may perform the simulation individually for each of the left hemisphere area and the right hemisphere area.

Figure 14:
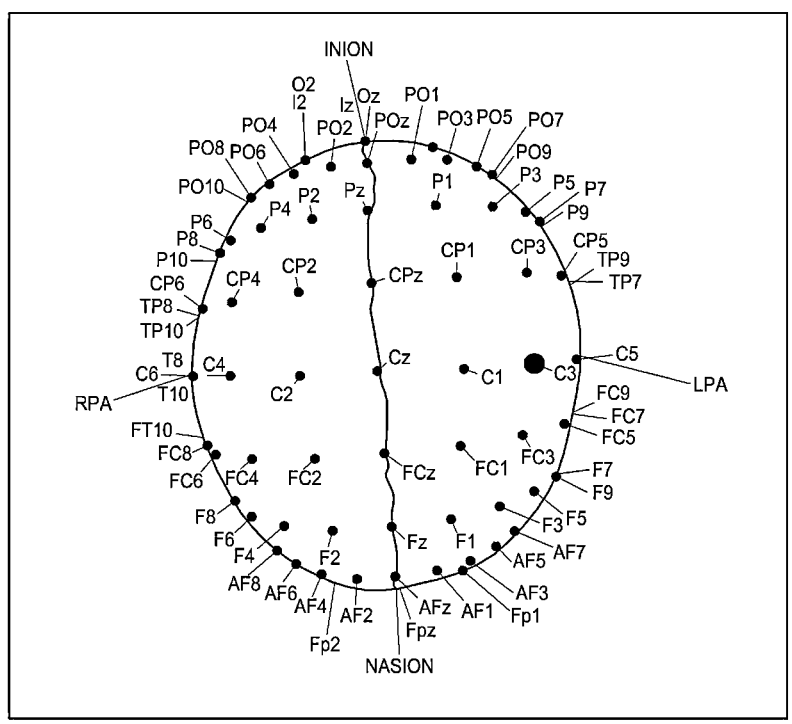
FIG. 14 is an exemplary diagram illustrating a form in which a brain area of an object is segmented into the left hemisphere area and a right hemisphere area in various embodiments.
Figure 15:
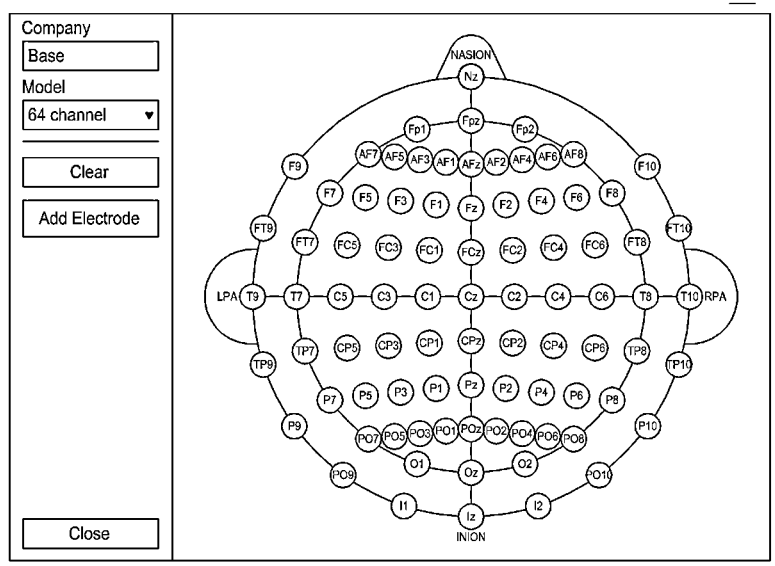
FIG. 15 is an exemplary diagram illustrating a first user interface (User Interface, UI) provided by a stimulation simulation server using a brain model for a brain lesion patient in various embodiments.

First, as illustrated in FIG. 14, the server 100 may segment the brain area of the object into the left hemisphere area and the right hemisphere area by using a first geodesic line connecting a first stimulation position corresponding to the nasal muscle and a second stimulation position corresponding to the laryngeal pole and a second geodesic line connecting a third stimulation position corresponding to the front of the left auricle and a fourth stimulation position corresponding to the front of the right auricle.

After that, the server 100 can simulate the electrical stimulation for the left hemisphere area of the brain of the object by selecting two or more stimulation positions located in the left hemisphere area among the remaining stimulation positions except for the filtered stimulation positions or can simulate the electrical stimulation for the right hemisphere area of the brain of the object by selecting two or more stimulation positions located in the right hemisphere area among the remaining stimulation positions except for the filtered stimulation positions At this time, the server 100 may filter the stimulation positions so that currents of different polarities are not applied to the same area. For example, when any one stimulation position located on the left hemisphere area is selected, the server 100 may filter at least one stimulation position in which a current having polarity opposite to that of the current applied to the above one stimulation position among the other stimulation positions located on the left hemisphere area (for example, when a positive current is applied to any one of the stimulation positions, the stimulation position to which the negative current is applied is filtered).

In addition, when any one stimulation position located on the right hemisphere area is selected, the server 100 may filter at least one stimulation position in which a current having a polarity opposite to that of the current applied to the above one stimulation position among the other stimulation positions located on the right hemisphere area.

That is, the server 100 may exclude the case in which the positive and negative electrodes are located in the same hemisphere in order to exclude the result for which clinical verification for safety has not been obtained.

By filtering unnecessary stimulation positions in advance according to the preset conditions as described above and performing the simulations by using only the remaining stimulation positions according to the filtered result, during the simulation, unnecessary calculations can be reduced.

The stimulation simulation method using the brain model for the brain lesion patient described above is described with reference to the flowchart illustrated in the drawings. For a simple description, the stimulation simulation method using the brain model for the brain lesion patient has been described illustrating a series of blocks, but the present invention is not limited to the order of the blocks, and some blocks may be performed sequentially in an order different from those illustrated in this specification or may be performed simultaneously. In addition, new blocks not described in this specification and drawings may be added, or some blocks may be deleted or changed. Hereinafter, a method of establishing the treatment strategy For the brain lesion patient by using the result of stimulation simulation according to the stimulation simulation method using the brain model for the brain lesion patient according to various embodiments of the present invention and a method of predicting the treatment effect will be described with reference to FIG. 16, FIG. 16 is a flowchart illustrating a method of establishing the treatment strategy for the brain lesion patient through the stimulation simulation by using the brain model for the brain lesion patient and predicting the treatment effect thereof in various embodiments.

Figure 16:
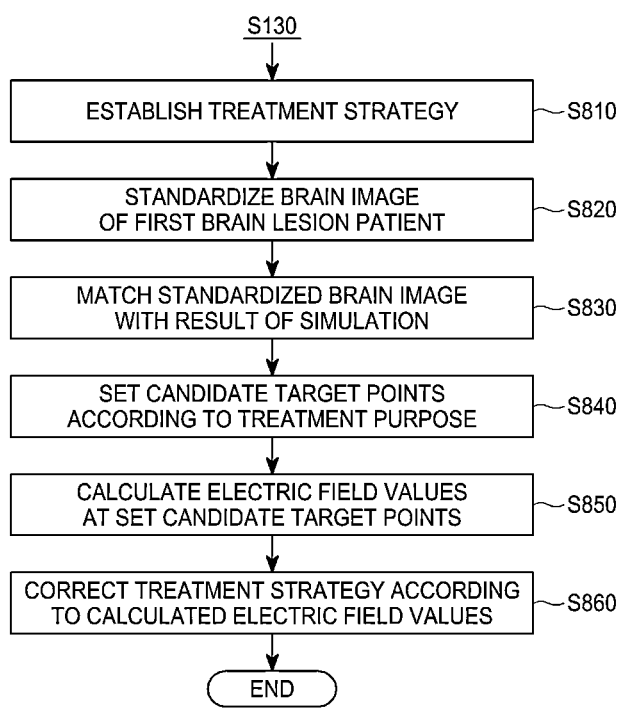
FIG. 16 is a flowchart illustrating a method of establishing a treatment strategy for a brain lesion patient through stimulation simulation using a brain model for the brain lesion patient in various embodiments, and predicting the treatment effect thereof.

Referring to FIG. 16, in step S810, the server 100 may establish the treatment strategy for a specific brain lesion patient by using the big data system constructed through the above process.

First, the server 100 can collect information on the brain image of specific brain lesion patient and the specific patient as prior information for establishing the treatment strategy for the specific brain lesion patient. For example, the server 100 may provide the UI to the user terminal 200 and may be input with not only up-loaded brain image for a specific brain lesion patient through the UI but also information such as race, gender, and age of the specific brain lesion patient.

After that, the server 100 can extract one or more data corresponding to the information about the specific brain lesion patient from the big data stored on the constructed big data system. For example, the server 100 can extract the data including at least one of the result of simulation for the one or more second brain lesion patients corresponding to the information on the first brain lesion patient among the plurality of brain lesion patients stored in the big data system by using the result of the simulation of the stimulation using the brain model generated in response to the brain image of the first brain lesion patient and the race, gender, and age of the first brain lesion patient and the treatment strategies established for one or more second brain lesion patients.

After that, the server 100 can establish the treatment strategy for the first brain lesion patient by using the extracted one or more data. For example, by using the result of the simulation on the one or more second brain lesion patients corresponding to information on the first brain lesion patient and the treatment strategy established for the one or more second brain lesion patients, the server 100 can determine the target point on the brain to be stimulated for the treatment of the first brain lesion patient, the optimal stimulation position combination according to the preset guide system (for example, 10-20 system) for applying the stimulation to the target point, and the intensity of stimulation to be applied to each of the one or more optimal stimulation positions included in the optimal stimulation position combination.

In various embodiments, the server 100 can establish the treatment strategy for the first brain lesion patient by using the result of the simulation of stimulation by using the brain model for the first brain lesion patient and can verify the treatment strategy for the first brain lesion patient by using the one or more data extracted from the big data stored in the big data system.

First, the server 100 can simulate the stimulation by using the brain model for the first-brain lesion patient and can determine a combination of the optimal stimulation positions for applying the stimulation to the preset target point in the brain of the first-brain lesion patient by using the result of the simulation of the stimulation. For example, the server 100 may determine the optimal stimulation position combination by using the linear relationship for each of the plurality of stimulation positions according to the preset guide system 10-20 system.

Herein, the optimal stimulation position may denote a position where the stimulation with the maximum efficiency is applied to the stimulation area appropriate to the patient of a specific disease obtained through various clinical or theoretical studies under the given conditions (for example, the area where the electrode can be located, the output of the electrode, or the like).

This is similar to a method of finding a solution to an inverse problem that finds a condition for obtaining a desired result rather than acquiring a result according to a given condition, and a numerical optimization method can be used. The applying the stimulation with the maximum efficiency described above denotes a stimulation condition in which the electric field in a desired area is maximized, and the linear relationship between the specific stimulation applied to each of the plurality of stimulation positions and the resulting electric field can be derived from the simulation of the electrical stimulation in order to obtain such a stimulation condition.

In various embodiments, the server 100 can derive the linear relationship between a specific stimulation and the electric fields output by applying the specific stimulation under arbitrary stimulation conditions as illustrated in Mathematical Formula 2 below from the result of simulation of the electrical stimulation.

$$E_m(r) = \alpha B_m(r) \qquad \text{<Mathematical Formula 2>}$$

Wherein E is an electric field, r is a coordinate of a stimulation position, in is an arbitrary stimulation condition, α is a ratio of an actual stimulation to a basic unit stimulation intensity, and B is the basic unit stimulation intensity.

The electric field E finally obtained according to Mathematical Formula 2 is equal to a product of the basic unit stimulation intensity B of the stimulation and the ratio α of the actual stimulation to the basic unit stimulation intensity, and when the stimulation is applied to the stimulation combinations at various stimulation positions in this manner, the linear relationship for two stimulations with different stimulation conditions can be expressed as Mathematical Formula 3.

$$E \sum m_i(r) = \sum_{i=1}^{n} \alpha_i B_{m_i}(r) \qquad \text{<Mathematical Formula 3>}$$

Herein, $m_i$ may be the i-th stimulation condition.

After that, the server 100 can derive the linear relationship between a combination of different stimulation conditions and an electric field output when stimulation is applied according to these stimulation conditions, as expressed in Mathematical Formula 3.

As a result, since the server 100 can obtain the linear system of equations for various stimulation conditions and desired stimulation intensities, the server 100 can obtain the stimulation conditions in which the maximum stimulation can be applied to the desired stimulation position by using numerical optimization. Herein, a least squares method, a weighted least squares method, an L1 norm constrained method, or the like may be applied, but the present invention is not limited thereto.

In various embodiments, the server 100 may calculate the optimal stimulation position for applying the electrical stimulation to the preset target point of the brain of the object by using the linear relationship according to Mathematical Formula 3 described above. For example, since the server 100 can know the desired result in reverse as the server 100 is input with the stimulation conditions including information on the target points of the brain of the object from the user, the server 100 can calculate the optimal stimulation position to which the electrical stimulation is to applied, and the optimal stimulation position combination can be determined by configuring the calculated optimal stimulation position into one combination.

After that, the server 100 may verify the optimal stimulation position combination determined according to the above method by using the one or more data extracted from the big data stored in the big data system. For example, the server 100 predicts the treatment effect according to the optimal stimulation position combination by using the one or more data extracted from big data and can perform verification on the optimal stimulation position combination determined according to the above-described method by determining whether the predicted treatment effect is larger than or equal to the standard.

In various embodiments, the server 100 may store information about the treatment strategy established in response to the first brain lesion patient according to the above method on the big data system. In this case, the server 100 may store the feedback information about the treatment strategy established in response to the first brain lesion patient on the big data system together.

For example, the server 100 has an advantage of being capable of providing information about the treatment strategy established in response to the first brain lesion patient according to the above method through the UI, being capable of being input with information about the result of performing treatment for the first brain lesion patient according to the treatment strategy, that is, the effect of the treatment as the feedback information, and being capable of establishing the more appropriate treatment strategy by matching the feedback information with the information about the treatment strategy established for the first brain lesion patient and recording the feedback information on the big data system and by filtering the information about the treatment strategy with poor treatment effect included in the feedback information in establishing the treatment strategy based on big data.

In step S820, the server 100 may standardize the brain image of the first brain lesion patient by using a standard brain coordinate system template. For example, the server 100 may standardize an MRI image which is a brain image of the first brain lesion patient by using a Montreal Neurological Institute (MNI) template as the standard brain coordinate system template. In this case, the server 100 may use the plurality of brain images to standardize the brain image of the first brain lesion patient by using the MNI template and standardize the brain image of the first brain lesion patient in a manner of calculating the average of the plurality of brain images and realigning other images to the matched image by using Affine matching with a plurality of variables assumed, but the present invention is not limited thereto.

In step S830, the server 100 can match the brain image of the first brain lesion patient standardized through the step S820 and the result of simulation of stimulation by using the brain model of the first brain lesion patient. For example, based on a result of simulating stimulation using a brain model of a first brain lesion patient, the server 100 may match the result (for example, the position of the point to which the electric field is applied as the stimulation is applied to the stimulation position and the electric field value at the point) of applying stimulation of a specific stimulation intensity to at least one of a plurality of stimulation locations on a standardized brain image and display the result.

In step S840, the server 100 can be input with the treatment purpose for the first brain lesion patient and can determine one or more candidate target points corresponding to the input treatment purpose by using the standardized brain image matched with the stimulation simulation result. For example, the server 100 can be input with the treatment purpose (for example, cognitive function improvement, arm exercise, leg exercise, memory improvement, or the like) of the first brain lesion patient through the UI and can determine the one or more candidate target points corresponding to the treatment purpose by considering the brain lesion position of the first brain lesion patient based on the standardized brain image of the first brain lesion patient.

In various embodiments, the server 100 may extract the stimulation target point data for each treatment purpose for the plurality of brain lesion patient from the big data stored in advance on the big data system and can determine one or more candidate target points (for example, the top N target points in the order of increasing the number of extracted target points among the plurality of stimulation target points corresponding to the treatment purpose according to the treatment purpose of the first brain lesion patient) based on the extracted stimulation target point data for each treatment purpose.

In step S850, the server 100 can be input with any one candidate target point selected from the user among the one or more candidate target points determined through step S840 and can calculate the first electric field applied to any one candidate target point selected according to the treatment strategy established for the first brain lesion patient as the treatment effect. For example, the server 100 can calculate the electric field value applied to any one candidate target point selected by the user while applying the treatment strategy (stimulation position, intensity of stimulation, or the like) established for the first brain lesion patient to a standardized brain image.

In step S860, the server 100 may correct the established treatment strategy by using the first electric field value at any one of the calculated target points. For example, when the first electric field value at any one of the calculated target points is larger than or equal to the reference electric field value, the server 100 does not correct the treatment strategy established for the first brain lesion patient, but can determine it as the final treatment strategy. On the other hand, when the first electric field value at any one of the calculated target points is smaller than the reference electric field value, the server 100 can correct the established treatment strategy for the first brain lesion patient so that the electric field value applied to any one target point is larger than or equal to the reference electric field value.

In various embodiments, the server 100 can select the plurality of recommended treatment strategies corresponding to the treatment purpose for the first brain lesion patient from the big data stored on the constructed big data system, can calculate each of the plurality of second electric field values applied to any one target point by applying each of the selected plurality of treatment strategies to the standardize brain image, and can provide information on the recommended treatment strategies corresponding to the second electric field value having a larger value than the calculated first electric field value among the calculated plurality of second electric field values together with information on the treatment strategies established for the first brain lesion patients.

That is, the server 100 has the advantage of being able to correct and confirm the treatment strategy established for the first brain lesion patient by predicting the treatment effect (electric field value) according to the treatment strategy established for the first brain lesion patient, and when there is a more effective treatment strategy meeting the treatment purpose, the server 100 has the advantage of being able to assist in performing more effective treatment for the first brain lesion patients by recommending information about the treatment strategy.

In various embodiments, the server 100 may provide a final treatment prescription for the first brain lesion patient by using the final treatment strategy (or the final treatment strategy and one or more recommended treatment strategies) determined according to the above method. For example, server 100 can generate a final treatment prescription report that includes information on the name of the brain lesion that the first brain lesion patient is suffering, the phase after brain lesion onset (for example, acute phase, subacute phase, chronic phase, or how many months have passed since the onset), treatment purpose (for example, Improvement of motor function (arm and leg), cognitive function improvement, memory improvement, or the like), concurrent treatment (for example, concurrent treatment method (physical therapy, exercise therapy, or occupational therapy), frequency, cycle, or the like), current dysfunction level (for example, a value entered according to the result of evaluation and examination in an existing hospital), and the total number of stimulations (frequency) and may provide the generated final treatment prescription report.

As described above, while the embodiments of the present invention have been described with reference to the accompanying drawings, those skilled in the art to which the present invention belongs will understand that the present invention can be embodied in other specific forms without changing the technical spirit or essential features. Therefore, it should be understood that the embodiments described above are exemplary ones in all respects and not restrictive.

The invention claimed is:

1. A stimulation simulation method using a brain model for a brain lesion patient, performed by a computing device, the method comprising:
   collecting brain images of the brain lesion patient;
   generating the brain model for the brain lesion patient by using the collected brain images; and
   simulating stimulation to the brain of the brain lesion patient by using the generated brain model, and
   wherein the generating the brain model for the brain lesion patient includes:
   segmenting the collected brain images into a plurality of areas, wherein the plurality of areas includes a plurality of first areas corresponding to each structure of the brain and one or more second areas corresponding to a brain lesion; and
   generating a three-dimensional brain model by using the brain image segmented into the plurality of areas, and
   wherein the generating the three-dimensional brain model includes:
   removing the one or more second areas among the plurality of areas by processing the brain images segmented into the plurality of areas;
   restoring the brain image from which the one or more second areas are removed by using a pre-trained second AI model; and
   generating a three-dimensional brain model by using the restored brain image.

2. The method according to claim 1, wherein the segmenting the collected brain images into the plurality of areas includes segmenting the collected brain images into the plurality of areas by using a pre-trained first AI model, wherein the pre-trained first AI model is trained by using a plurality of brain images segmented into a plurality of areas which are labeled with information on each of the segmented areas as training data, and is input with an unsegmented brain images and outputs the brain images segmented into the plurality of areas.

3. The method according to claim 1, wherein the generating the three-dimensional brain model includes:
- removing the one or more second areas among the plurality of areas by processing the brain images segmented into the plurality of areas;
- restoring the brain image from which the one or more second areas are removed by using the pre-trained second AI model, wherein the pre-trained second AI model is trained by using a plurality of brain images from which at least some areas have been removed and a plurality of normal brain images from which at least some areas have not been removed as training data, and is input with a brain image in which at least some area is removed and outputs a brain image in which the removed at least some area is restored; and
- generating the three-dimensional brain model by using the restored brain images and setting the one or more second areas on the generated three-dimensional brain model based on an attribute of the removed one or more second areas.

4. The method according to claim 1, wherein the generating the three-dimensional brain model further includes:
- generating a brain lesion model by using the removed one or more second areas and matching the generated brain lesion model with the generated three-dimensional brain model.

5. The method according to claim 1, wherein the segmenting the collected brain images into the plurality of areas includes:
- collecting information about the brain lesion patient;
- extracting one or more data corresponding to the collected information about the brain lesion patient from pre-stored big data, wherein the pre-stored big data include at least one among the plurality of brain images corresponding to each of the plurality of patients, a plurality of the brain models corresponding to each of the plurality of brain images, and a plurality of results of the simulation derived by simulating the stimulation by using each of the plurality of brain models; and
- segmenting the collected brain images into the plurality of areas by using the extracted one or more data.

6. The method according to claim 1, wherein the segmenting the collected brain images into the plurality of areas includes:
- collecting information about the brain lesion patient;
- segmenting the collected brain image into the plurality of areas by using a pre-trained first AI model;
- extracting one or more data corresponding to the collected information about the brain lesion patient from pre-stored big data; and
- verifying the brain images segmented into the plurality of areas by using the extracted one or more data.

7. The method according to claim 1, wherein the segmenting the collected brain images into the plurality of area includes selecting one or more first areas having the same attribute as the one or more second areas among the plurality of first areas and combining the selected one or more first areas and the one or more second areas as one area.

8. The method according to claim 1, wherein the simulating the stimulation to the brain of the brain lesion patient includes:
- generating a three-dimensional brain map configured with a plurality of meshes based on attributes of each of the plurality of areas included in the generated three-dimensional brain model; and
- simulating electrical stimulation based on a plurality of stimulation positions according to a preset guide system by using the generated three-dimensional brain map.

9. The according to claim 1, wherein the generating the brain model for the brain lesion patient includes generating brain lesion information having an arbitrary attribute based on brain lesion statistical data by gender, race, and age for a plurality of users and generating a virtual brain model by using the generated brain lesion information.

10. A stimulation simulation server using a brain model for a brain lesion patient comprising:
- a processor;
- a network interface;
- a memory; and
- a computer program loaded on the memory and executed by the processor,
- wherein the computer program includes:
- an instruction for collecting brain images of brain lesion patient;
- an instruction for generating the brain model for the brain lesion patient by using the collected brain images; and
- an instruction for simulating stimulation to the brain of the brain lesion patient by using the generated brain model,
- wherein the instruction for generating the brain model for the brain lesion patient includes:
- an instruction for segmenting the collected brain images into a plurality of areas, wherein the plurality of areas includes a plurality of first areas corresponding to each structure of the brain and one or more second areas corresponding to a brain lesion; and
- an instruction for generating a three-dimensional brain model by using the brain image segmented into the plurality of areas,
- wherein the instruction for generating the three-dimensional brain model includes:
- an instruction for removing the one or more second areas among the plurality of areas by processing the brain images segmented into the plurality of areas;
- an instruction for restoring the brain image from which the one or more second areas are removed by using a pre-trained second AI model; and
- an instruction for generating a three-dimensional brain model by using the restored brain image.

11. A non-transitory, computer readable medium storing instructions that, when executed by a computer, cause the computer to execute:
- collecting brain images of the brain lesion patient;
- generating the brain model for the brain lesion patient by using the collected brain images; and
- simulating stimulation to the brain of the brain lesion patient by using the generated brain model, and
- wherein the generating the brain model for the brain lesion patient includes:
- segmenting the collected brain images into a plurality of areas, wherein the plurality of areas includes a plurality of first areas corresponding to each structure of the brain and one or more second areas corresponding to a brain lesion; and
- generating a three-dimensional brain model by using the brain image segmented into the plurality of areas, and
- wherein the generating the three-dimensional brain model includes:
- removing the one or more second areas among the plurality of areas by processing the brain images segmented into the plurality of areas;

restoring the brain image from which the one or more second areas are removed by using a pre-trained second AI model; and generating a three-dimensional brain model by using the restored brain image.

\* \* \* \* \*